UNITED STATES PATENT OFFICE.

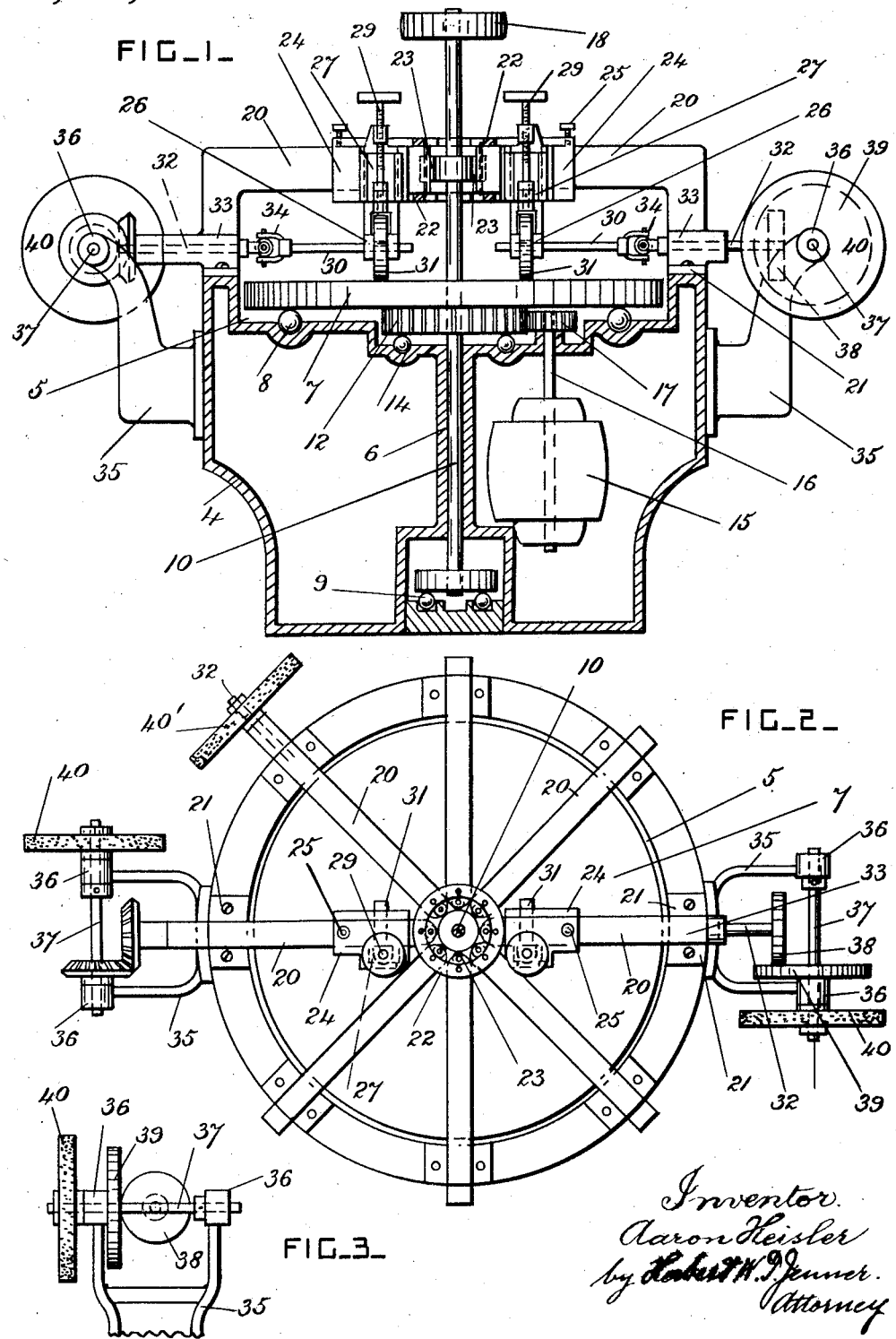

AARON HEISLER, OF PITTSBURGH, PENNSYLVANIA.

GRINDING-MACHINE.

1,356,361.

Specification of Letters Patent.  Patented Oct. 19, 1920.

Application filed May 18, 1920. Serial No. 382,246.

*To all whom it may concern:*

Be it known that I, AARON HEISLER, a citizen of the United States, residing at Pittsburgh, in the county of Allegheny and State of Pennsylvania, have invented certain new and useful Improvements in Grinding-Machines, of which the following is a specification.

This invention relates to machines for grinding or polishing small articles, and which are provided with a series of grinding or polishing wheels which may be operated separately or simultaneously and at any desired speeds; and it consists in the novel construction and combination of the parts hereinafter fully described and claimed.

In the drawings, Figure 1 is a vertical section through a machine constructed according to this invention. Fig. 2 is a plan view of the same. Fig. 3 is an end view of one of the grinding devices.

A supporting frame 4 is provided, and it has a circular chamber 5 at its top, and a vertical bearing 6 under the center of the chamber. A large friction disk 7 is arranged in the chamber 5, and is preferably supported on an antifriction bearing 8, such as a ball-bearing. A similar antifriction bearing or step 9 is also provided at the lower part of the frame, and 10 is a shaft journaled in the vertical bearing 6 and supported by the bearing or step 9. The disk 7 is secured on the shaft 10, and the shaft 10 is revolved by any approved driving mechanism.

A toothed driving wheel 12 is secured on the shaft 10 under the disk 7, and preferably rests on an antifriction bearing 14. The frame is preferably hollow, and an electric motor 15, or any other suitable motor, is arranged inside the frame either vertically or horizontally and drives a shaft 16, having a toothed pinion 17 secured on it and gearing into the toothed wheel 12.

If desired however, the vertical shaft 10 may be revolved by any other approved means, such as by a driving wheel or pulley 18 secured on its upper end portion.

The driving face of the friction disk 7 is preferably flat, but it may be of any other approved form if desired. Horizontal arms 20 are arranged radially of the central shaft 10, and have flanges 21 on their vertical outer end portions which are secured to the frame around the circular chamber. The inner ends of these arms are preferably connected together by fastening devices 22, and are provided with antifriction devices or rollers 23 for the shaft 10 to run in.

Carriages 24 are mounted to slide on the arms 20, and they have screws 25 for clamping them on the arms. These carriages 24 support forked bearings 26 which are provided with vertical slides or stems 27 which are slidable in lateral projections on the carriages. Screws 29 are provided, and are supported by the carriages, and engage with the slides or stems 27. Inner shafts 30 are journaled in the forked bearings 26, and have friction wheels 31 splined on them. These friction wheels 31 are pressed against the friction driving disk by the screws 29, and are raised clear of it when desired.

Radial horizontal shafts 32 are arranged in bearings in the vertical outer end portions 33 of the arms 20, and are operatively connected with the inner shafts 30 by universal joints 34.

The universal joints 34 permit the friction wheels to be raised and lowered by the screws, and are necessary when the driving disk is not flat, but any other approved driving devices may be used which will permit the shafts 32 to be revolved in their bearings by means of the driving disk and the friction wheels 31. When the disk is flat universal joints are not so necessary, but may be used to advantage.

Brackets 35 are secured around the frame, and have bearings 36 in which horizontal shafts 37 are journaled. These shafts 37 are driven from the radial shafts 32 by means of friction wheels 38 and 39, but other driving devices such as beveled toothed wheels may be used instead of the friction wheels 38 and 39 if desired. The grinding wheels 40 are secured on the shafts 37, and they may be emery wheels, or any other similar devices for grinding, polishing or buffing small articles. The small articles are supported by hand, and are pressed into contact with the grinding or polishing wheels of the machine.

Certain of the grinding or polishing wheels may be secured directly to the outer end portions of the radial shafts 32 if desired, and if suitable for some kinds of work, and a grinding wheel 40' is shown thus arranged at the left hand in Fig. 2. The various grinding and polishing wheels can all be driven at the same speed, or can be driven at different speeds by sliding the carriages 24 to suitable positions on the radial supporting arms 20, and any grinding wheel can be stopped and started independently of the others by means of the screw 29 pertaining to it.

This machine permits a number of different kinds of articles to be ground at the same time, and as many radial shafts and grinding wheels as desired can be provided.

What I claim is:

1. In a grinding machine, a frame provided with radial arms, a friction driving disk journaled in the frame under and concentric with the radial arms, carriages adjustable radially on the said arms, radial shafts journaled in the frame and adapted to revolve grinding wheels, friction wheels operatively connected with the said radial shafts, said friction wheels being operatively connected with the said carriages and adjustable radially with them to vary their speeds of revolution independently of each other, and means supported by the said carriages for placing the said friction wheels into and out of driving contact with the said friction disk.

2. In a grinding machine, a frame, a friction driving disk journaled in the frame, carriages supported by the frame and adjustable radially of the driving disk, radial shafts journaled in the frame and adapted to revolve grinding wheels, friction wheels operatively connected with the said radial shafts, said friction wheels being operatively connected with the said carriages and adjustable radially with them to vary their speeds of revolution independently of each other, and means supported by the carriages and adapted to place the said friction wheels into and out of engagement with the driving disk.

3. In a grinding machine, a frame provided with a circular chamber, a friction driving disk journaled in the frame and arranged in the said chamber, driving mechanism arranged in the said chamber below the driving disk and operatively connected with it, carriages supported by the frame above the driving disk and adjustable radially of it, radial shafts journaled in the frame and adapted to revolve grinding wheels, friction wheels operatively connected with the said radial shafts, and means supported by the carriages and adapted to place the said friction wheels into and out of engagement with the driving disk.

4. In a grinding machine, a frame, a friction driving disk journaled in the frame, carriages supported by the frame and adjustable radially of the driving disk, radial shafts journaled in the frame, shafts journaled in the frame and arranged crosswise of the radial shafts at their outer ends and adapted to drive grinding wheels, driving wheels connecting each radial shaft with the cross shaft pertaining to it, friction wheels operatively connected with the inner end portions of the radial shafts, and means supported by the said carriages and adapted to place the said friction wheels into and out of engagement with the driving disk.

5. In a grinding machine, a frame, a friction driving disk journaled in the frame, carriages supported by the frame and adjustable radially of the driving disk, radial shafts journaled in the frame and adapted to revolve grinding wheels, vertically adjustable slides carried by the said carriages, inner radial shafts journaled in the said slides and arranged substantially in line with the aforesaid radial shafts, flexible couplings operatively connecting the adjacent ends of the inner and outer radial shafts, and friction wheels splined on the inner radial shafts and adapted to be revolved by the said driving disk.

6. In a grinding machine, a frame, a vertical driving shaft journaled in the frame, arms arranged radially of the said shaft and having antifriction devices at their inner ends for it to run in, said arms having their outer ends secured to the frame, carriages adjustable in the said arms, a friction driving disk secured on the said shaft and arranged under the said arms and carriages, antifriction devices between the said disk and the frame, radial shafts journaled in the outer end portions of the said arms and adapted to revolve grinding wheels, friction wheels operatively connected with the said radial shafts, and means supported by the carriages and adapted to place the said friction wheels into and out of driving contact with the said friction disk.

In testimony whereof I have affixed my signature.

AARON HEISLER.